May 26, 1964   W. A. VOLKHOLZ   3,134,298
FOCUSING MEANS FOR SLIDE PROJECTOR
Filed Feb. 2, 1961
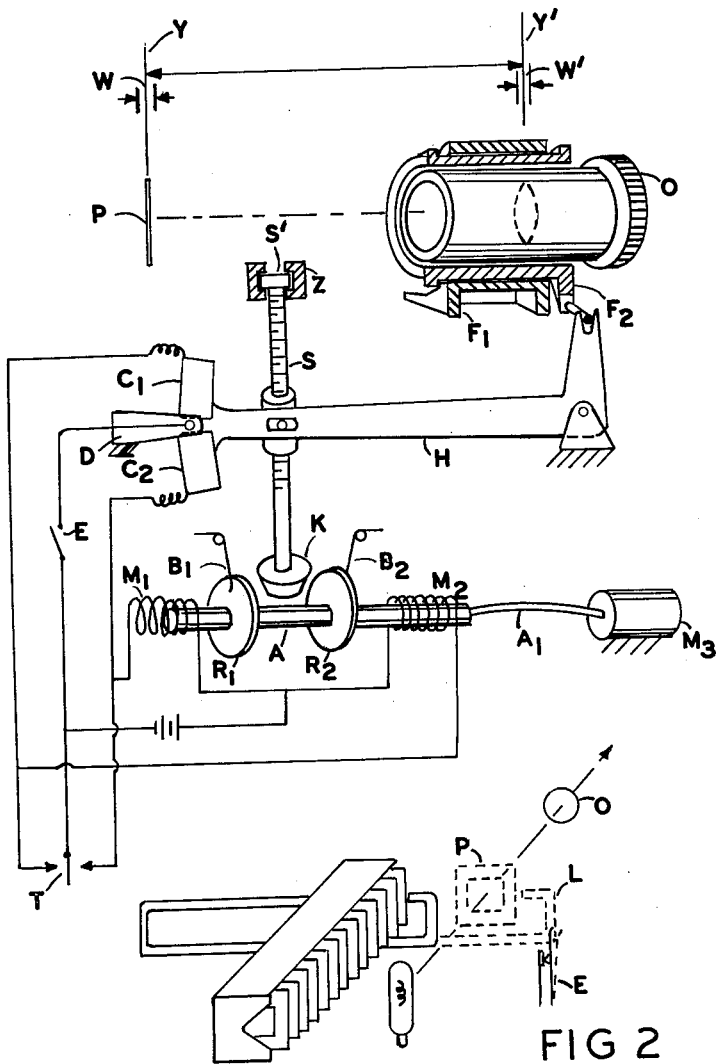
INVENTOR.
WILLIAM A. VOLKHOLZ
BY
James P. Malone ର
United States Patent Office 3,134,298
Patented May 26, 1964

3,134,298
FOCUSING MEANS FOR SLIDE PROJECTOR
William A. Volkholz, Berlin, Germany, assignor to
Viewlex, Inc., Holbrook, N.Y.
Filed Feb. 2, 1961, Ser. No. 86,797
1 Claim. (Cl. 88—24)

This invention relates to means for automatic adjustment of focus in projecting apparatus.

Adjustment of focus proves necessary in the projection of a series of individual slides as the film mounted in a slide frame cannot always be positioned very exactly in the proper optical plane of the lens, after changing slides. This is partly caused by the types of slide mounts available, with their inevitable optical and mechanical imperfections. The glass used in such mounts is of varying thickness and it often has unequal refraction coefficients. Sharpness of projection is further affected by influences of temperature.

Aside from the well-known adjustment of focus by positioning the lens by hand, various devices are known which position the lens by additional motor, mechanical, electro-mechanical, or pneumatic means. All these devices so far attempted a mere relative adjustment, where the reference position for additional focusing is arbitrarily determined by the setting of focus for the first slide. With this method, the range of mechanical adjustment may later turn out to be insufficient for certain slides lacking in sharpness. In this case, the lens has to be again adjusted by hand.

This situation becomes particularly critical if the mechanism is designed for a small range of adjustment with the intention of providing a very exact fine setting. This limits the focusing range to an undesirable degree.

According to the invention, means are provided in projectors which adjust the lens with reference to a plane of mean optical sharpness. After projecting each slide, if a focusing adjustment was made for it, the lens is brought back to the plane of mean sharpness by an automatic control mechanism. In this way, refocusing after almost every slide becomes unnecessary; merely those slides have to be refocused which show a noticeably blurred projection.

Accordingly, a principal object of the invention is to provide new and improved focusing means in slide projectors.

Another object of the invention is to provide new and improved focusing means in slide projectors having means for automatically returning the lens to a predetermined mean focus plane.

Another object of the invention is to provide new and improved focusing means in slide projectors having means for automatically returning the lens to a predetermined mean focus plane during the interval between viewing slides.

Another object of the invention is to provide an improved means for adjustment in focusing in slide projections comprising means for poistioning the lens and means to automatically reposition said lens to a position of mean focus between the slide viewing intervals.

These and other objects of the invention will be apparent from the following specifications and drawings in which:

FIGURE 1 is a perspective view of an embodiment of the invention with schematic circuit details.

FIGURE 2 is a perspective view of a detail of the invention.

The invention is illustrated in FIGURES 1 and 2. FIGURE 1 shows a lens guide consisting of two parts, one F1 fixed to the projector housing, the other F2 movable axially. The movable part F2 holds the lens O. The axial movement of the part F2 inside the fixed part F1 is controlled by the lever H and the threaded spindle S, to provide fine adjustment and refocusing. The spindle S is rotated in either a right or a left sense by a conical wheel K, which frictionally engages either of the two friction wheels R1 or R2. The two wheels R1 and R2 are mounted on a rotatable spindle A which is free to move axially and is centered by two springs B1 and B2. In accordance with the sense of connection of the spindle S to spindle A, the lens O is displaced forward or backward when the coils M1, M2 are activated by the remote-control switch T. The driving armature spindle A is frictionally coupled to the spindle S which is driven in one direction by motor M3 and flexible shaft A1. Armature A is axially moved in either direction by the action of either of the electromagnetic motor coils M1 or M2, which may be alternately connected to a voltage source, by the switch T. This switch may take the form of a remote-control switch.

Means are provided in a different mode of operation to focus the lens automatically to a mean optical plane Y', before or after each projection of a slide. This mode makes use of the same mechanical means of activation and adjustment that serve the purpose of refocusing, as described above.

However, in the refocusing mode the adjustment is independent of the remote-control switch T. Another switching element is provided, which is a function of lens position only. It consists of two contact bars C1 and C2, insulated from each other and lever H and fixed to the lever H, and a contact spring D firmly attached to the casing. The contact bars C1 and C2 move with the lever H. The contact spring D on the other hand, is fixed. This three-terminal switch element is connected in parallel with the switch T, by way of the interruptor E installed at the slide-changer.

As can be seen in FIGURE 2, the slide-changer L opens the interrupter E while a slide P is being projected. The contact bars C1 and C2 are adjusted in relation to the contact spring D in such a way that the lens O is always moved back to the position of mean focus Y' by alternate coupling of the friction wheels R1 and R2 to the conical wheel K. In the position of mean focus, the spring D is not in contact with the contact bars C1 and C2 and thus opens the circuit for the two magnetic coils M1 and M2. In this position there is no further coupling to the conical wheel K, and the movement of the lens is stopped. According to the invention, the coupling becomes effective only when the lens is in a position other than in the plane of mean focus and no slide is being projected. The need for refocusing with the remote-control switch T to obtain best sharpness of the picture is reduced to cases when the slide projected is considerably blurred.

Therefore, any variation W of the means slide plane Y may be adjusted by moving the lens through the corresponding variation W', and the lens is automatically returned to the mean focus plane Y', while the slides are being changed. The viewing screen, not shown, must be preset so that the image on it is in focus when the slide and lens are in the mean focus planes Y and Y', respectively.

The spindle S is rotatably mounted in the projector casing, so that it has no axial movement. Axial motion is restrained by the guide Z fixedly connected to the casing which restains collar S' which is fixedly connected to spindle S.

When it is desired to use the switch T, the switch E is opened.

Many modifications may be made by those desiring to practice the invention without departing from the scope thereof, which is defined by the following claim.

I claim:

In a slide projector having a focus lens and slide moving means,
means to move said lens to and from a predetermined plane of mean focus comprising,
a stationary lens mount,
a lens barrel slidably mounted in said mount,
a mechanical linkage including a lever connected to said lens barrel and mounted to slide said barrel in said mount,
manual switch operated motor means connected to said linkage to focus said lens,
and control means connected to said linkage to automatically reposition said lens to said plane of mean focus comprising,
a stationary contact connected to said motor means,
a pair of contacts connected to and movable with said lever, said pair of contacts being spaced on either side of said stationary contact when said lever and said lens are in mean focus position, said pair of con- being electrically connected to said motor means, one of said pair of contacts being adapted to make contact to said stationary contact when said lens is moved from said mean focus position in one direction and the other of said pair of contacts being adapted to make contact with said stationary contact when said lens is moved from the said focus position in the other direction, said motor means being responsive to circuits through said contacts to move said lens barrel.

References Cited in the file of this patent

UNITED STATES PATENTS

| | | |
|---|---|---|
| 1,271,929 | Nelson | July 9, 1918 |
| 1,950,166 | Durholz | Mar. 6, 1934 |
| 2,008,020 | Jackman | July 16, 1935 |
| 2,705,438 | Peto | Apr. 5, 1955 |
| 3,000,258 | Misuraca | Sept. 19, 1961 |

FOREIGN PATENTS

| | | |
|---|---|---|
| 1,226,261 | France | Feb. 22, 1960 |
| 1,076,965 | Germany | Mar. 3, 1960 |